US009128672B1

(12) United States Patent
Loo (10) Patent No.: US 9,128,672 B1
(45) Date of Patent: Sep. 8, 2015

(54) VACUUM-SEALED BASE FOR STABILIZING A PORTABLE COMPUTING DEVICE ON A SURFACE

(71) Applicant: Google Inc., Mountain View, CA (US)

(72) Inventor: Kenneth Ryan Loo, San Jose, CA (US)

(73) Assignee: Google Inc., Mountain View, CA (US)

( * ) Notice: Subject to any disclaimer, the term of this patent is extended or adjusted under 35 U.S.C. 154(b) by 388 days.

(21) Appl. No.: 13/764,129

(22) Filed: Feb. 11, 2013

(51) Int. Cl.
G06F 1/16 (2006.01)
G06F 1/20 (2006.01)
H05K 7/20 (2006.01)

(52) U.S. Cl.
CPC .............. G06F 1/1633 (2013.01); G06F 1/20 (2013.01)

(58) Field of Classification Search
CPC ........ G06F 1/20; G06F 1/203; H05K 7/20136
See application file for complete search history.

(56) References Cited

U.S. PATENT DOCUMENTS

| 3,720,433 | A | * | 3/1973 | Rosfelder | 294/188 |
| 5,645,261 | A | * | 7/1997 | Glynn | 248/551 |
| 6,152,414 | A | | 11/2000 | Jondrow | |
| 8,681,492 | B2 | * | 3/2014 | Fan | 361/679.58 |
| 2002/0119726 | A1 | * | 8/2002 | Wilk | 446/92 |
| 2004/0256535 | A1 | | 12/2004 | Desch | |
| 2008/0061492 | A1 | * | 3/2008 | Zwettler et al. | 271/20 |
| 2010/0320341 | A1 | | 12/2010 | Baumann et al. | |

* cited by examiner

Primary Examiner — Robert J Hoffberg
(74) Attorney, Agent, or Firm — Lerner, David, Littenberg, Krumholz & Mentlik, LLP (57) ABSTRACT

Aspects of the present disclosure provide techniques for stabilizing a computing device having a touch screen display on a flat surface. This helps prevent the device from being inadvertently moved, tipped over or otherwise displaced by a user when the display screen is tapped. By using a fan or a type of air pump to evacuate air from underneath a bottom surface of the device, a low-pressure region can be created that effectively pins the device to the flat surface. An airtight vacuum seal on the bottom of the device prevents air from entering or escaping the low-pressure region that has been created. A configurable actuator mounted within the device may regulate airflow to and from this low-pressure region. The fans or pump used to create the airtight seal may also be used for thermal management of internal device components.

20 Claims, 6 Drawing Sheets

VACUUM-SEALED BASE FOR STABILIZING A PORTABLE COMPUTING DEVICE ON A SURFACE

BACKGROUND

Touch screen displays have become very common on different consumer products. Typically, such screens can detect the presence and location of a user's touch within an area of the display. However, tapping on the screen by the user may make the product slide or tip over when it is placed on a flat surface. This is particularly challenging with lightweight products such as an ultrabook.

BRIEF SUMMARY

Aspects of this disclosure are advantageous for stabilizing a portable computing device having a touch screen display on a flat surface. By using one or more fans or a type of air pump to remove air located underneath a bottom surface of the device, a low-pressure vacuum can be created between the notebook and the flat surface. With low pressure underneath the device and a higher atmospheric pressure above it, the device may be pinned to the flat surface with significant force. This helps prevent the device from being inadvertently tipped over when a user taps on the touch screen display.

One aspect of the disclosure provides a computing device that includes a base having at least a bottom surface for placement on a work surface and a top surface opposite the bottom surface. Attached to the bottom surface of the computing device is a sealing component. The sealing component creates a boundary area between the bottom surface of the base and the work surface upon which the computing device is placed. The computing device includes an actuator that can be configured between a first state to allow air outward from the boundary area and a second state to allow air inward to the boundary area. The computing device also includes an airflow means that is adapted to extract air from within the boundary area so as to create a vacuum seal between the computing device and the resting surface. In one example, the airflow means comprises a fan. In another example, the airflow means comprises an air pump.

The actuator is coupled to one or more valves. The valves are configured to control airflow to and from the boundary area. A sensor monitors air pressure within the boundary area. In response to a signal from the sensor that air pressure within the boundary area meets a threshold value, the airflow means is deactivated. Alternatively, in response to a signal from the sensor that air pressure within the boundary area falls below a threshold value, the actuator is configured to allow air inward to the boundary area to increase the air pressure within the boundary area.

Another aspect of the disclosure provides a system that includes a computing device. The system includes means for sealing a bottom surface of the computing device to a work surface upon which the computing device is placed to create a boundary area between the bottom surface and the resting surface, means for allowing airflow outward and inward to the boundary, and means for extracting air from within the boundary so as to create a vacuum seal between the computing device and the work surface. The means for allowing air outward and inward to the boundary area is coupled to one or more valves. The valves control airflow to and from the boundary area.

Yet another aspect of the disclosure provides a method that includes configuring an actuator in a computing device having a bottom surface to create a low-pressure boundary area between the bottom surface and a work surface upon which the computing device is place. In communication with actuator, the method may include operating one or more airflow valves between a first state to allow air outward from the boundary area and a second state to allow air inward to the boundary area, and activating an airflow means to extract air from within the boundary area so as to create a vacuum seal between the computing device and the flat surface.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

The subject matter of the present disclosure provides techniques and arrangements for stabilizing a notebook or lightweight device that has a touch screen display on a flat surface. By using one or more fans or a type of air pump to remove air located underneath a bottom surface of the device, a low-pressure region can be created between the notebook and a flat surface the device is resting on. With low pressure underneath the device and a higher atmospheric pressure above it, the device may be held down to the flat surface with significant force. Accordingly, this acts to prevent the device from being inadvertently moved, tipped over or otherwise displaced by a user when the display screen is touched. An airtight vacuum seal on the bottom of the device prevents air from entering or escaping the low-pressure region that has been created. In this regard, a configurable actuator mounted within the device may regulate airflow to and from this low-pressure region. In some aspects, the fans that exhaust air from the low-pressure region may also be used for thermal management of internal device components.

Figure 1:
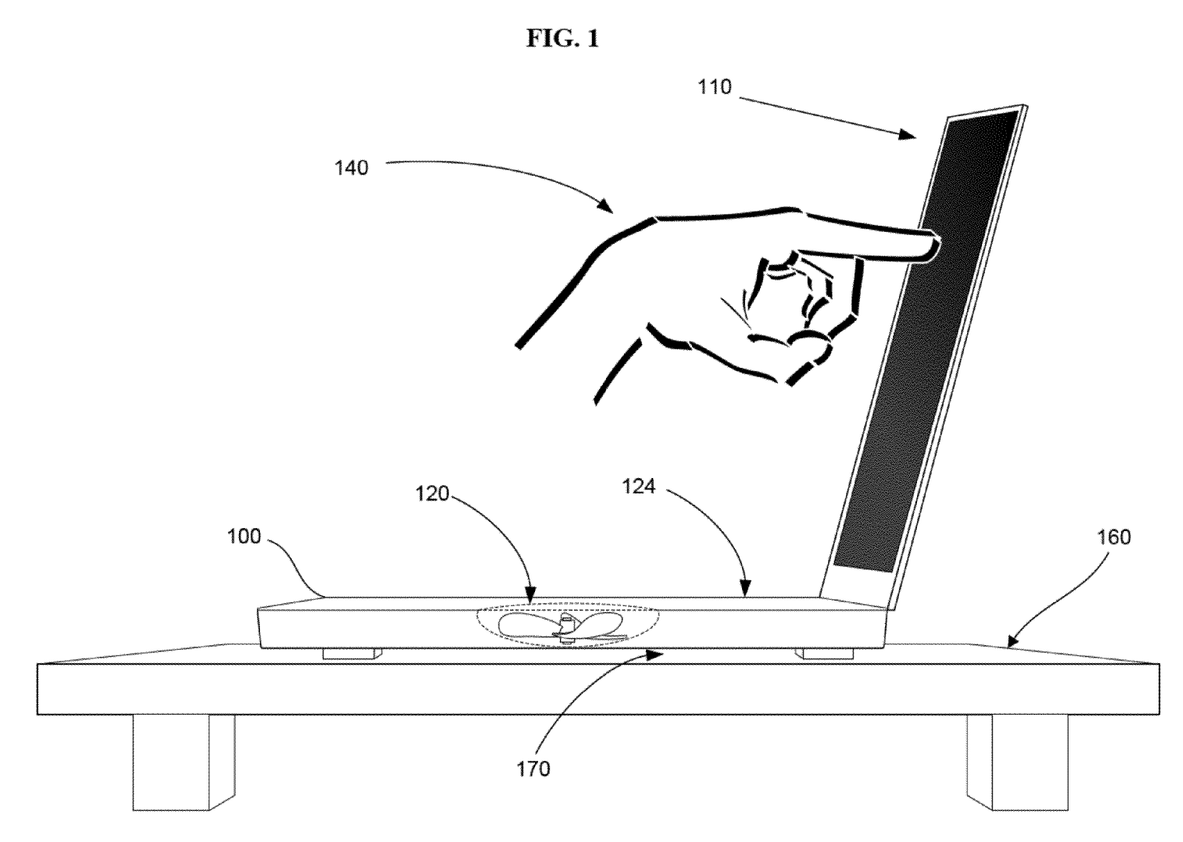
FIG. 1 is an illustration of example of a computing device including a surface-stabilizing device in accordance with aspects of the disclosure.

FIG. 1 is an illustration of example computing device 100 including a surface-stabilizing device 120. In this example, the computing device 100 includes a base unit 124 attached to a touch screen display 110. The touch screen display 110 may include a screen and a display unit that can be configured to display images and to detect a touch on the screen. For example, the touch screen display 110 may be a general display device, such as a liquid crystal display (LCD), a plasma display panel (PDP) or a light emitting diode (LED) display. Contact with the touch screen display 110 can include any type of direct or indirect touch or contact using, for example, a finger of a user 140 or a stylus. The computing device 100 is shown resting on a flat surface 160, such as a desktop or tabletop. In some situations, as the user 140 makes contact with the touch screen display 110, the computing device 100 may tip over or rock backwards lifting the base unit 124 at an angle off of the flat surface 160.

As shown in FIG. 1, placing the device on the flat surface 160 may create a lower region 170 between the base unit 124 of the device 100 and the flat surface 160. A pocket of air may exist within this lower region 170. According to aspects, by removing the air from this lower region 170 underneath the device 100, a low-pressure vacuum can be created that effectively pins the device 100 to the flat surface 160. For example, air can be removed from the lower region area 170 using the surface-stabilizing device 120 that can be configure to exhaust air from the lower region area 170 by forcing the air out via openings (not shown) in the computer device 100. This process of exhausting air from the lower region 170 using the surface-stabilizing unit 120 is further described below.

Figure 2:
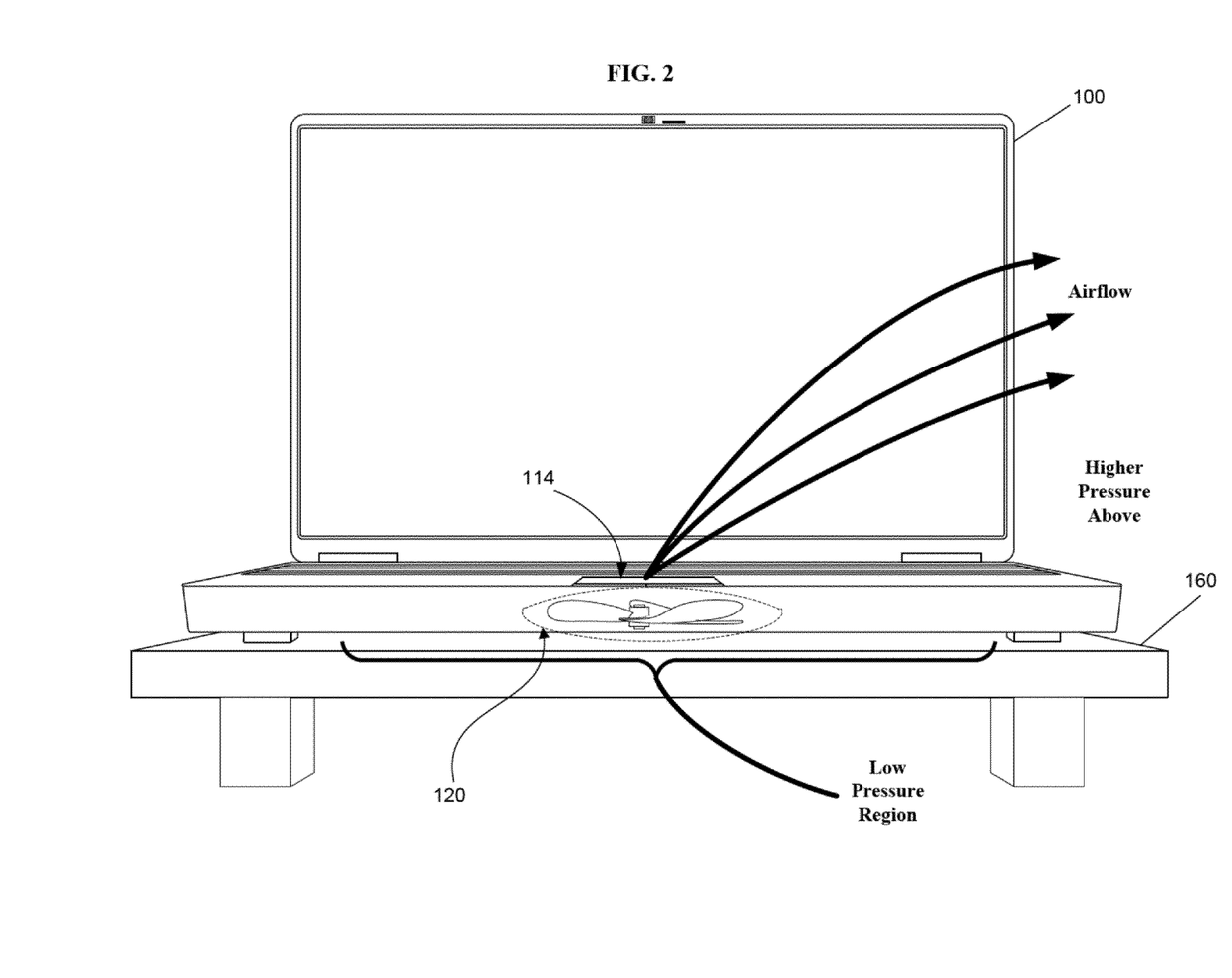
FIG. 2 is a front view of the computing device of FIG. 1 in accordance with aspects of the disclosure.

FIG. 2 is a front view of the computing device resting on the flat surface 160. As shown, the computing device may include the surface-stabilizing unit 120 therein. The surface-stabilizing unit 120 is configured to evacuate air located in an air gap between the computing device 100 and the flat surface 160. For example, the computing device 100 may include an opening 114 adapted to allow airflow to pass through the computing device 100 from the air gap. This creates a vacuum in a low-pressure region underneath the computing device 100. The air pressure in this low-pressure region becomes lower than the atmospheric pressure that exists above the device. The contrasting air pressures may force or otherwise pin the computing device 100 to the flat surface 160.

Figure 3:
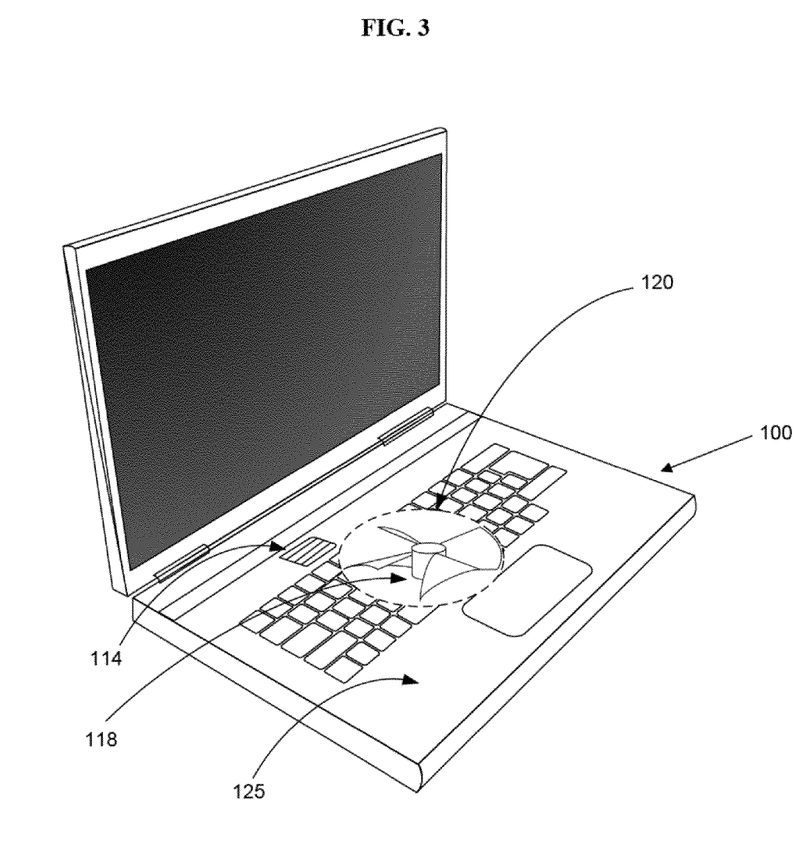
FIG. 3 is a top view of the computing device of FIG. 1 in accordance with aspects of the disclosure.

FIG. 3 is a top view of the computing device 100 of FIG. 1. As shown, at least one component of a surface-stabilizing device 120 may include means for activating airflow through the device 120, such as with a fan 118. In this regard, the fan can be configured to exhaust air from underneath the computer device 100. For example, an opening 114 may be disposed on a top surface 125 of the computing device 100 to allow air to flow from another opening (not shown) underneath the computer device 100. However, it should be understood that the openings may be otherwise situated in various location on the computing device 100.

Air may be regulated through these two openings by using one or more airflow valves. For example, the airflow valves may be a type of solenoid valve that can be electromechanically operated. The solenoid valve can be controlled by sending an electric current through a solenoid in which airflow can be switched on and off by moving the solenoid out and then back in place.

In some examples, the fans may also form part of a cooling system for the computing device 100. For example, one or more fans used to provide an adequate cooling airflow over internal components of the computing device 100 may be configured to work in conjunction with the surface-stabilizing unit 120.

Figure 4:
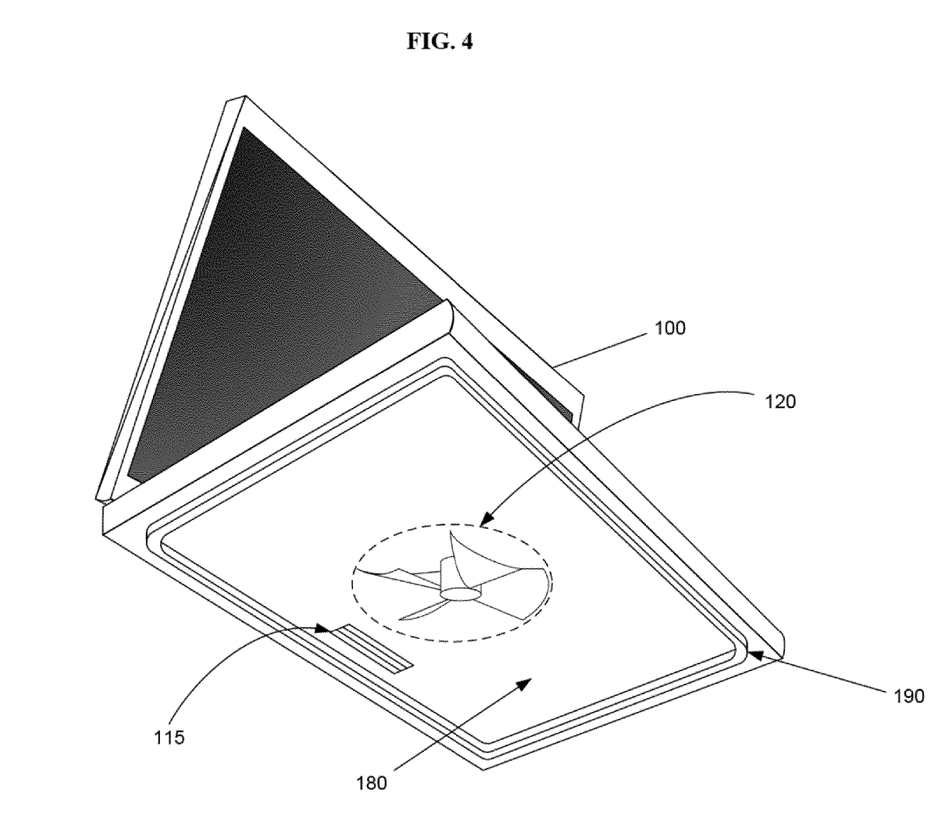
FIG. 4 is a bottom view of the computing device of FIG. 1 in accordance with aspects of the disclosure.

In FIG. 4, a bottom view of the computing device 100 of FIG. 1 is shown. As previously discussed, the surface-stabilizing device 120 may extract air from a low-pressure region between a bottom surface 180 of the computing device 100 and a flat surface that the device 100 is resting on. The air may be extracted through an opening 115 disposed on the bottom surface 180 of the device 100.

As shown, the computing device 100 may include a sealing base 190 attached to the bottom surface 180 of the device 100. For example, the sealing base 190 may protrude in a direction away from the bottom surface 180 to form a footing structure for the computing device 100. The sealing base 190 may be configured to prevent air from entering or escaping the low-pressure region from along outer sides of the device 100. The sealing base 190 may be constructed from a type of material that can form an airtight seal with the flat surface 160. For example, the sealing base 190 can be a type of rubber, foam, silicone or a durable airtight sealing material that can be rigged enough to also function as support the computing device 100, as well as be cosmetically and visually pleasing.

Figure 5:
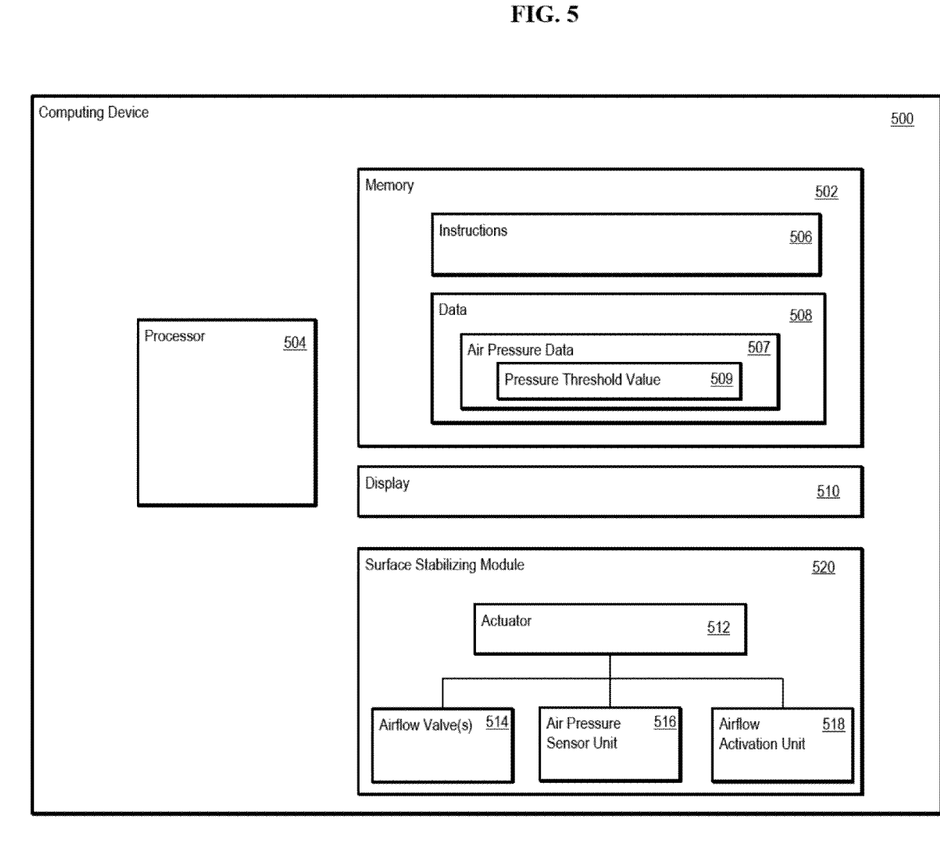
FIG. 5 is a block diagram depicting an example of a computing device incorporating a surface-stabilizing module in accordance with aspects of the disclosure.

FIG. 5 is a block diagram depicting an example of a computing device 500 incorporating a surface-stabilizing module 520. The computing device 100 may include a processor 504, a memory 502 and other components typically present in general purpose computers, such as a central processing unit (CPU), CD-ROM, hard drive, and a display 510, for example, a monitor having a touch-screen, a small LCD screen, or another device such as an electrical device that can be operable to display information processed by the processor 504, speakers, a modem and/or network interface device, user input device, such as a mouse, joystick, keyboard, touch screen or microphone, and all of the components used for connecting these elements to one another. Moreover, computers in accordance with the computing device 500 described herein may include devices capable of processing instructions and transmitting data to and from humans and other computers including general purpose computers, laptop, netbooks or ultrabooks, PDAs and other mobile computing devices.

The memory 502 may store instructions 506 and data 508 that are accessible by the processor 504. The processor 504 may execute the instructions 506 and access the data 508 to control the operations of the computing device 500.

The processor 504 may be a suitable processor, such as various commercially available general-purpose processors. Alternatively, the processor 504 may be a dedicated controller such as an application-specific integrated circuit ("ASIC"). Although FIG. 5 functionally illustrates the processor 504 and memory 502 as being within a single block, the processor 504 and memory 502 may actually comprise multiple processors and memories that may or may not be stored within the same physical housing. Accordingly, references to a processor, computer or memory may include references to a collection of processors or memories that may or may not operate in parallel.

The memory 502 may be a type of tangible, non-transitory memory operative to store information accessible by the processor 504, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter of the present disclosure may include different combinations of the foregoing, whereby different portions of the instructions 506 and data 508 are stored on different types of media.

The instructions 506 may be a set of instructions to be executed directly (such as machine code) or indirectly (such as scripts) by the processor 504. For example, the instructions 506 may be stored as computer code (e.g., software program) on a computer-readable medium. In that regard, the terms "instructions" and "programs" may be used interchangeably herein. The instructions 506 may be stored in object code format for direct processing by the processor 504, or in other computer language including scripts or collections of independent source code modules that are interpreted on demand or compiled in advance. Functions, methods and routines of the instructions are explained in more detail below.

The data 508 can be retrieved, stored or modified by the processor 504 in accordance with the instructions 506. For instance, although the computing device 500 is not limited by a particular data structure, the data 508 can be stored in computer registers, in a relational database as a table having a plurality of different fields and records, or XML documents. The data 508 can also be formatted in a computer-readable format such as, but not limited to, binary values, ASCII or Unicode. Moreover, the data 508 can include information sufficient to identify relevant information, such as numbers, measurements, descriptive text, proprietary codes, pointers, and references to data stored in other memories, including other network locations, or information that is used by a function to calculate relevant data. For example, the data 508 can include air pressure data 507 readings and a pressure threshold value 509 that can be encoded based on the instructions 508 in a format used to describe units of air pressure, such as Pounds Per Square Inch (Psi), Pascal (Pa), Bar (Ba) and Torr.

As shown in FIG. 5, the computing device 500 may also include a surface-stabilizing module 520. The surface-stabilizing module 520 may be operable in conjunction with several other components for creating a low-pressure region between a bottom surface of the computing device 500 and a flat surface that the device is resting on. For example, when the computing device 500 is placed on a flat surface, the surface-stabilizing module 120 may be employed automatically or by a control mechanism configured for selectively switching the surface-stabilizing module 520 on and off. The surface-stabilizing module 520 can also be controlled by a user interface shown on the display 510 of the computing device 500. In operation, the surface-stabilizing module 520 may evacuate air located in an air gap between the device 500 and the flat surface it is resting on thereby creating a vacuum or a low-pressure region underneath the computing device 500. The air pressure in this low-pressure region may be in contrast to a higher atmospheric pressure that exists above the computing device 500. The contrasting air pressures may force or otherwise pin the computing device 500 to the flat surface until the air pressures above and below the computing device 500 have been equalized.

The surface-stabilizing module 520 may include the following components: an actuator 512 used as a controlling mechanism for several operations within the module 520, an air pressure sensor unit 516, an airflow activation unit 518, and one or more airflow valves 514. The components may be capable of direct and indirect communication, for example, by using internal communication wiring and components of the computing device 500. Each component may also include middleware software to manage and integrate the components with the computing device 500. The middleware may have a set of services that allow multiple processes running from the surface-stabilizing module 520 to interact with the processor 504, memory 502, instructions 506 and data 508.

The computing device 500 may be stabilized to a flat surface by creating a low-pressure region of air between the notebook and the flat surface that has a lower air pressure than the atmospheric air above the computing device 500. To regulate airflow to and from this low-pressure region underneath the computing device 500, the one or more airflow values 514 may be engaged. In one example, the airflow valves 514 may be a type of solenoid valve that can be electromechanically operated. For example, the solenoid valve can be controlled by sending an electric current through a solenoid in which airflow can be switched on and off by moving the solenoid out and then back in place. The airflow valves 514 may direct or control the flow of air in the computing device 500 by opening, closing, or partially obstructing various air passageways.

The air passageways may be configured to allow air to pass through from one region of the computing device 500 to another region. For example, an opening may be disposed on a bottom surface of the computing device 500. This opening may be coupled to another opening disposed on the top surface of the computing device 500. Air may be regulated through these two opening by using the airflow valves 514. In should be appreciated that this is merely one illustrative example of how an air passageway can be constructed, as the passageway may be configured in several other ways to allow the airflow valves 514 to control the passage of air to and from the low-pressure region of the computing device 500. In some aspects, the airflow valves 514 may operate manually such as with a handle, lever, or pedal, or they can operate automatically in conjunction with the actuator 512 and the air pressure senor unit 516. Automatic operation and use of the airflow valves 514 is explained in more detail below.

As shown, the computing device 500 may include the air pressure sensor unit 516 configured or otherwise located in or near a base of the computing device 500. For example, the air pressure sensor unit 516 may operate in conjunction with a sensing means, such as sensor or electrical pressure transducer that can detect air pressure within the low-pressure vacuum created between the base of the computing device 500 and a flat surface for resting the device 500 on. Air pressure in the vacuum may be much lower than the atmospheric pressure that exists outside of the vacuum. As a result, the lower the air pressure in the vacuum the more secure the computing device may be on the flat surface.

The sensing means can detect air pressure in a vacuum and produce an electrical signal related to a measurement of that air pressure. For example, the air pressure measurements may be detected and calculated in a unit of measurement used to describe air pressure, such as Torr. The air pressure measurements obtained may be received at the air pressure sensor unit 516 and compared to air pressure data 507 readings stored in memory 502. Theses measurements may also be shown to a user on display 510 of the computing device 500.

In some aspects, the air pressure sensor unit 516 may be configured to automatically instruct the actuator 512 to close the airflow valves 514 if air pressure within the low-pressure region meets a predetermined pressure threshold 509 stored in memory 508. For example, the predetermined pressure threshold value 509 may indicate a level of negative air pressure needed in the low-pressure region in order to secure the computing device to a specific type of surface.

If air pressure measurements within the low-pressure region fall below the predetermined pressure threshold value, the air pressure sensor unit 516 may interface with the actuator 512 to cause or otherwise instruct the actuator 512 to open the airflow valves 514. For example, the actuator 512 may be coupled to, or may otherwise form as part of, an assembly such that the actuator 512 can automatically open the airflow valves 514 in response to a signal from the air pressure sensor unit 516. An advantage of this type of configuration is that the pressure threshold value 509 may be used to protect the device or flat surface from damage caused by creating to strong of a vacuum in the low-pressure region between the computer device 500 and the flat surface.

To automatically lower air pressure in the low-pressure region when the computing device is placed on a substantially flat surface, the air pressure sensor unit 516 can be configured to automatically initiate the airflow activation unit 518 upon opening of the airflow valves 514 and/or in response to air pressure within the low-pressure region exceeding the predetermined pressure threshold value 509. For example, the air pressure sensor unit 516 may be adapted to interface with the airflow activation unit 518 either directly Or via the actuator 512 such that upon activation of actuator 516 and opening of airflow valves 514, the airflow activation unit 518 automatically generates airflow through openings formed at either end of an air passageway to remove air from the low-pressure region.

The air pressure sensor module 516 may also be adapted to interface with the airflow activation unit 518 either directly or Indirectly to activate and/or deactivate the airflow activation unit 518 in response to air pressure variations within the low-pressure region. For example, stabilization of the computing device 500 may be reestablished by automatically Initiating the airflow activation unit 518. This may be in situations where an air vacuum seal between the computing device 500 and a flat surface has been disturbed due to a sudden and hard vibration applied to the flat surface, such as someone bumping into a table that the computing device is placed on.

As described above, the airflow activation unit 51R may be configured to remove air from underneath the computer device 500 and through the airflow valves 514. In some examples, the airflow activation unit 518 may be configured to direct air outwardly through an opening relative to an airflow valve and discharge or exhaust that airflow out a different opening in the computing device 500 via an air passageway.

There are several ways that the airflow activation unit 518 can be configured to direct air located underneath the computer device 500 outwardly and inwardly. As one example, the airflow activation unit 518 may include a type of pump that can depressurize air underneath the computer device 500 in order to force the air through the air passageways. The pump can be operated manually or activated via the actuator 518 as described above. As a second example, the airflow activation unit 518 may include one or more fans that can be configured to exhaust air from underneath the computer device 500. In that regard, the fans may also provide a dual purpose by forming part of a cooling system for the computing device 500. For example, this may be accomplished by configuring the one or more fans in the airflow activation unit 518 to have a capacity for providing an adequate cooling airflow over internal components of the computing device 500.

In addition to the components described above and illustrated in the figures, various operations will now be described of the subject matter disclosed herein. The following operations do not have to be performed in the precise order described below. Rather, various steps and/or functions may be handled in a different order or simultaneously. The steps and/or functions can also be added or omitted unless otherwise stated.

Figure 6:
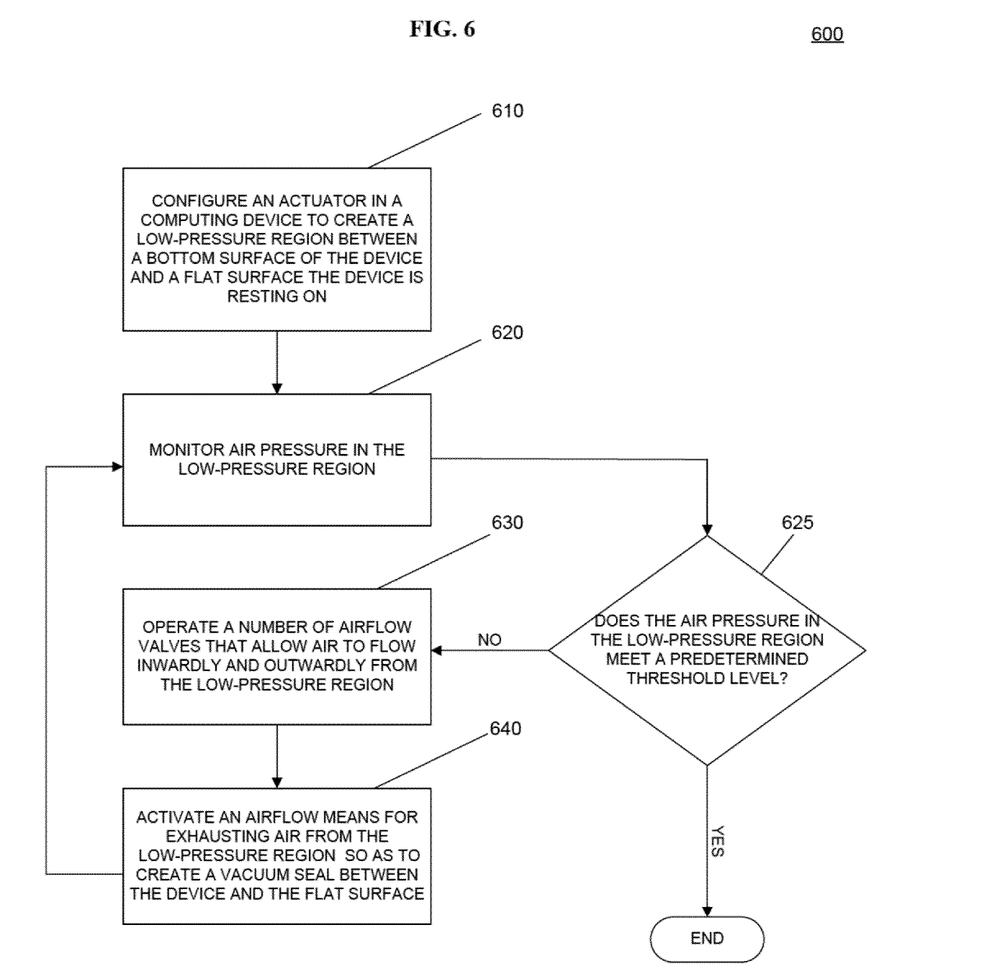
FIG. 6 is a flow diagram of a method in accordance with aspects of the disclosure.

FIG. 6 is a flow diagram of a method 600, which may be used, for example, to stabilize computing device 500 described above.

At stage 610, an actuator in the computing device may be configured to create a low-pressure vacuum in a region between a bottom surface of the device and a flat surface the device is resting on. According to aspects, by removing air from underneath the bottom surface of the device, a low-pressure vacuum can be created that effectively pins the device to the flat surface. The actuator may be a central mechanism for activating a system the draws air to and from the low-pressure region. For example, the actuator may operate in conjunction with several other components of the computing device that may cause the actuator to instruct the other components to force air out of the low-pressure region to create a vacuum in that region. The actuator can also instruct the other components to allow air to flow into the low-pressure region to increase air pressure in that region thereby relieving the vacuum that was created.

At stage 620, air pressure in the low-pressure region may be monitored. For example, a type of air pressure sensor or electrical pressure transducer may be configured to detect air pressure in the low-pressure region and produce an electrical signal related to a measurement/reading of that air pressure. The sensor may compare current air pressure readings to previous readings taken in the region. In this regard, the air pressure readings may be stored in a unit of measurement used to describe air pressure in a vacuum, such as Torr.

At stage 625, it may be continually determined whether air pressure in the low-pressure region meets a predetermined threshold value. The threshold value may be used to protect the device or flat surface from damage caused by a vacuum created in the low-pressure region underneath the computer device. This threshold value may be stored and updated as necessitated, for example, depending on the type of surface the device in resting on. If the detected air pressure in the low-pressure region meets the predetermined threshold value, the method 600 may automatically stop. Otherwise, method 600 may continue onto stage 630. For example, an alarm may sound to indicate that a safety procedure has been activated to stop method 600 from proceeding.

At stage 630, one or more airflow valves that allow air to flow inwardly and outwardly from the low-pressure region may be operated. For example, the airflow valves may control the flow of air in the computing device by opening, closing, or partially obstructing various air passageways. In one example, the airflow valves may be a type of solenoid valve that can be controlled by sending an electric current through a solenoid in which airflow can be switched on and off by moving the solenoid out and then back into place. In some aspects, the airflow valves may operate manually such as with a handle or lever, or they can operate automatically in conjunction with the actuator from stage 610. For example, the actuator may be coupled to the airflow valves such that the actuator can cause the airflow valves to automatically open or close in response to signals produced at stage 620 regarding a current reading of air pressure in the low-pressure region.

At stage 640, an airflow means may be activated for exhausting air from the low-pressure region so as to create a vacuum seal between the device and the flat surface. For example, the airflow means can include a type of pump that can depressurize air in the low-pressure region in order to force the air from underneath the computer device. The pump can be operated manually or activated automatically by the actuator at stage 610. In another example, the airflow means can include one or more fans that can be configured to exhaust air from underneath the computer device. In this regard, the fans may also form part of a cooling system for internal components of the computing device. To protect the device or flat surface from damage, method 600 may return to stage 620 in order to further monitor the air pressure in the low-pressure region.

The above-described aspects of the present disclosure may be advantageous for stabilizing on a flat surface a computing device having a touch screen display. By using one or more fans or a type of air pump to evacuate air from underneath a bottom surface of the device, a low-pressure vacuum can be created that effectively pins the device to the flat surface. This may allow the computing device to be of a very light construction while still preventing it from tipping over due to user's tap on the touch screen. In this regard, the device can be designed without a concern as to where its center of gravity is located. Moreover, internal components of the computing device can be configured for their optimal location while ignoring each component's mass and its effect on the computing device's center of gravity.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computing device, comprising:
   a base having at least a bottom surface for placement on a work surface and a top surface opposite the bottom surface, the base having internal components;
   internal components inside the computing device for operating the computing device;
   a sealing component attached to the bottom surface of the computing device, the sealing component creating a boundary area between the bottom surface of the base and the work surface upon which the computing device is placed;
   an actuator being configurable between a first state to allow air outward from the boundary area and a second state to allow the air inward to the boundary area; and
   an airflow device adapted to extract the air from within the boundary area so as to create a vacuum seal between the computing device and the work surface and to provide cooling airflow over the internal components of the computing device.

2. The computing device of claim 1, wherein the airflow device comprises a fan.

3. The computing device of claim 1, wherein the airflow device comprises an air pump.

4. The computing device of claim 1, wherein the actuator is coupled to one or more valves, the one or more valves being configured to control airflow to and from the boundary area.

5. The computing device of claim 4, further comprising a sensor to monitor air pressure within the boundary area.

6. The computing device of claim 5, where in response to a signal from the sensor that air pressure within the boundary area meets a threshold value, the device is deactivated.

7. The computing device of claim 4, wherein in response to a signal from the sensor that air pressure within the boundary area falls below a threshold value, the actuator is configured to allow the air inward to the boundary area to increase the air pressure within the boundary area.

8. A system, comprising:
   a computing device including internal components inside of the computing device;
   a means for sealing a bottom surface of the computing device to a work surface upon which the computing device is placed to create a boundary area between the bottom surface and the work surface;
   a means for allowing airflow outward and inward to the boundary area; and
   a means for extracting air from within the boundary area so as to create a vacuum seal between the computing device and the work surface, and provides cooling airflow over the internal components of the computing device.

9. The system of claim 8, wherein the means for extracting the air from within the boundary area comprises a fan.

10. The system of claim 8, wherein the means for extracting the air from within the boundary area comprises a pump configured to depressurize the air within the boundary area.

11. The system of claim 8, wherein the means for allowing air outward and inward to the boundary area is coupled to one or more valves, the one or more valves control the airflow to and from the boundary area.

12. The system of claim 8, further comprising means for monitoring air pressure within the boundary area.

13. The system of claim 12, wherein the means for extracting the air from within the boundary area is deactivated when the air pressure within the boundary area meets a threshold value.

14. The system of claim 12, wherein in the event that the means for monitoring air pressure determines that the air pressure within the boundary area falls below a threshold value, the means for allowing the airflow inward to the boundary area is enabled.

15. A method, comprising:
    configuring an actuator in a computing device having a bottom surface to create a low-pressure boundary area between the bottom surface and a work surface upon which the computing device is placed;
    in communication with actuator, operating one or more airflow valves between a first state to allow air outward from the boundary area and a second state to allow the air inward to the boundary area; and
    activating an airflow device to extract the air from within the boundary area so as to create a vacuum seal between the computing device and the work surface and to provide cooling airflow over internal components of the computing device.

16. The method of claim 15, further comprising extracting the air from within the boundary area through the one or more airflow valves.

17. The method of claim 15, further comprising monitoring air pressure within the boundary area.

18. The method of claim 17, further comprising:
    determining whether the monitored air pressure within the boundary area meets a threshold value; and
    when the monitored air pressure meets the threshold value deactivating the airflow device.

19. The method of claim 18, further comprising activating a signal when the monitored air pressure within the boundary area meets a threshold value.

20. The method of claim 18, further comprising:
    determining whether the monitored air pressure within the boundary area falls below a threshold value; and
    when the monitored air pressure falls below the threshold, configuring the actuator to allow the air inward to the boundary area to increase the air pressure within the boundary area.

* * * * *